United States Patent
Lipiec et al.

(10) Patent No.: US 10,058,848 B2
(45) Date of Patent: Aug. 28, 2018

(54) METHOD OF CARRYING OUT A CHEMICAL REACTION WITH THE USE OF A CATALYST

(71) Applicant: INSTYTUT ELEKTROTECHNIKI, Warsaw (PL)

(72) Inventors: Wojciech Lipiec, Wroclaw (PL); Edward Orlowski, Wroclaw (PL); Marek Malinowski, Wroclaw (PL); Jacek Chmielowiec, Wroclaw (PL); Grzegorz Pasciak, Wroclaw (PL)

(73) Assignee: INSTYTUT ELEKTROTECHNIKI, Warszawa (PL)

( * ) Notice: Subject to any disclaimer, the term of this patent is extended or adjusted under 35 U.S.C. 154(b) by 20 days.

(21) Appl. No.: 15/126,970

(22) PCT Filed: Mar. 17, 2015

(86) PCT No.: PCT/IB2015/000341
§ 371 (c)(1),
(2) Date: Sep. 16, 2016

(87) PCT Pub. No.: WO2015/140620
PCT Pub. Date: Sep. 24, 2015

(65) Prior Publication Data
US 2017/0106353 A1    Apr. 20, 2017

(30) Foreign Application Priority Data

Mar. 19, 2014  (PL) .......................... 407582

(51) Int. Cl.
| | | |
|---|---|---|
| *B01J 19/12* | (2006.01) | |
| *C01C 1/02* | (2006.01) | |
| *C08B 31/18* | (2006.01) | |
| *C01B 3/02* | (2006.01) | |
| *B01J 35/00* | (2006.01) | |
| *H01M 8/1018* | (2016.01) | |
| *B22F 1/02* | (2006.01) | |
| *H01M 4/90* | (2006.01) | |
| *B22F 1/00* | (2006.01) | |
| *B01J 23/745* | (2006.01) | |
| *C01B 31/20* | (2006.01) | |
| *C01C 1/12* | (2006.01) | |

(52) U.S. Cl.
CPC ............. *B01J 23/745* (2013.01); *B01J 19/12* (2013.01); *B01J 35/006* (2013.01); *B01J 35/0033* (2013.01); *C01B 3/025* (2013.01); *C01B 31/20* (2013.01); *C01C 1/026* (2013.01); *C08B 31/18* (2013.01); *H01M 4/9041* (2013.01); *B22F 1/0003* (2013.01); *B22F 1/0018* (2013.01); *B22F 1/025* (2013.01); *C01B 2203/066* (2013.01); *C01B 2203/068* (2013.01); *C01B 2203/1047* (2013.01); *C01C 1/12* (2013.01); *H01M 2008/1095* (2013.01)

(58) Field of Classification Search
CPC ...... B01J 23/745; B01J 19/12; B01J 35/0033; B01J 35/006; C01C 1/026; C01C 1/12; C08B 31/18; C01B 3/025; C01B 2203/068; C01B 2203/066; C01B 2203/1047; B22F 1/025; B22F 1/0018; B22F 1/0003; H01M 4/9041; H01M 2008/1095
See application file for complete search history.

(56) References Cited

U.S. PATENT DOCUMENTS

| | | | | |
|---|---|---|---|---|
| 2,765,330 | A * | 10/1956 | Kirshenbaum | ........ B01J 8/1809 174/74 R |
| 3,017,256 | A * | 1/1962 | Richardson | .............. B01J 8/001 196/132 |
| 3,409,471 | A * | 11/1968 | Sturm | ...................... B01J 23/70 422/186.1 |
| 4,541,924 | A | 9/1985 | Rosensweig | |
| 4,545,879 | A | 10/1985 | Wan et al. | |
| 2004/0210289 | A1* | 10/2004 | Wang | .................. A61K 9/5094 607/116 |
| 2006/0233703 | A1* | 10/2006 | Little | .................... B01J 19/085 423/659 |
| 2015/0251981 | A1* | 9/2015 | Thevasahayam | ..... C07C 29/147 204/157.9 |

OTHER PUBLICATIONS

International Search Report for App. No. PCT/IB2015/000341 dated Jul. 16, 2015.

* cited by examiner

*Primary Examiner* — Nicholas A Smith
*Assistant Examiner* — Colleen M Raphael
(74) *Attorney, Agent, or Firm* — Walker & Jocke

(57) ABSTRACT

An exemplary embodiment provides for a method of conducting a chemical reaction involving the powder catalyst, in particular ferromagnetic catalyst. The method is characterized in that while conducting a chemical reaction, particles of the catalyst comprising a ferromagnetic material are put into oscillation by the oscillating magnetic field with a frequency greater than 0.1 Hz and a magnetic field induction greater than 0.01 mT. Oscillating magnetic field here is a field the induction vector of which changes its direction in time. Putting catalyst particles into oscillation increases the efficiency of the chemical reaction by several dozen to several hundred percent.

4 Claims, No Drawings

METHOD OF CARRYING OUT A CHEMICAL REACTION WITH THE USE OF A CATALYST

BACKGROUND

Catalysis is a phenomenon to accelerate the chemical reaction due to the addition of a small amount of catalyst, which itself is not subjected to permanent transformation, but only forms transient compounds or complexes with other reactants. Function of the catalyst is to change the path of the kinetic reaction by lowering the activation energy of a chemical reaction and to create other transient complexes, relative to the reaction conducted in a non-catalytic way. As a result, both the reaction leading to the product as well as in the whose opposite direction, leading to restoring the reactants is accelerated. The ratio of the product amount to the number of reactants that have not been reacted at the end of the process is the same as that without a catalyst, but the process takes less time. Catalysis is important for many industrial processes, such as production of ammonia, hydrogen, sulphuric acid, plastics and oil refining (cracking, hydrocracking, reforming, etc.). Catalysis, which is the effect of organic catalysts (enzymes), is the basis of life processes on Earth.

Miniature reactor used to produce a chemical mixture, using a powder catalyst made of particles with magnetic properties which provide greater contact with the chemical mixture is known from German Patent specification No. DE10159129. After the reaction, the powder catalyst can be extracted by the magnetic field for further use.

The reactor comprises one inlet of the two supply lines connected to the pipes in the flow direction, and a second inlet of the catalytic material, which at the outlet has the shape of a cone, and large space with an arm embedded in the coil is formed between the inlets.

SUMMARY

An exemplary embodiment provides a method for conducting a reaction involving the powder catalyst, in particular ferromagnetic catalyst.

Process temperature, pressure, chemical composition and form of the catalyst has the influence on the course and direction of catalytic reactions.

The catalytic material is made in the form of a powder and has the properties of paramagnetic or ferromagnetic material. Moreover, each of the supply lines is provided with at least one pump. A method for preparing a chemical mixture in a solvent using a catalyst material consists in that the catalyst has a form of a powder with a paramagnetic or ferromagnetic properties, which after the reaction is removed from the chemical mixture using a magnetic field, and used again.

BRIEF DESCRIPTION

An exemplary embodiment provides during the reaction, catalyst particles comprising ferromagnetic material are put into oscillation by the oscillating magnetic field. Oscillating magnetic field is a field whose induction vector changes its direction in time.

An exemplary embodiment provides a powder catalyst, comprising particles having a nanometric, micrometric, or macrometric size, is put into oscillation.

An exemplary embodiment provides a powder catalyst, whose particles are made of at least one material, wherein at least one material is ferromagnetic, is put into oscillation.

An exemplary embodiment provides a ferromagnetic particles covered with the catalyst material are put into oscillation.

An exemplary embodiment provides particles in the form of layered nanowires in which at least one layer has ferromagnetic properties are put into oscillation.

An exemplary embodiment provides particles of the powder catalyst are put into oscillation by the oscillating magnetic field with a frequency greater than 0.1 Hz and a magnetic induction greater than 0.01 mT.

Surprisingly, it was found that the oscillating motion of catalyst particles relative to the molecules of the reactants characterized by a high frequency increases the frequency the formation of the reactant—catalyst complexes, which increases the efficiency of the catalysis process, and thus the yield of the product manufacturing process. An exemplary embodiment provides allows significant acceleration in the product manufacturing process.

EXAMPLES

Example 1

The method of conducting a chemical reaction involving the catalyst is based on that the reactants are introduced into the reaction chamber and the chemical reaction is conducted in the presence of a powder catalyst, wherein the catalyst particles of nanometric size, comprising ferromagnetic material, are put into oscillation by the oscillating magnetic field with a frequency of 0.1 Hz and induction of 0.01 mT. Oscillating magnetic field here is a field the induction vector of which changes its direction in time. After the reaction the product is discharged from the reaction chamber, wherein the catalyst particles are separated from the product.

Example 2

The method of conducting a chemical reaction involving the catalyst takes place as in the first example, except that catalyst powder comprising particles having a micrometric size is put into oscillation, the particles are made of two materials, wherein one material is ferromagnetic, and the second one, applied on its surface, has catalytic properties.

Example 3

The method of conducting a chemical reaction involving the catalyst takes place as in the first example, except that catalyst powder comprising particles having a macrometric size is put into oscillation.

Example 4

The method of conducting a chemical reaction involving the catalyst takes place as in the first example, except that catalyst powder, whose particles form layered nanowires, wherein one of the layers is ferromagnetic, is put into oscillation.

Example 5

The method of conducting a chemical reaction, involving the catalyst, comprising ammonia synthesis is as follows: reactants, such as reaction gas of the stoichiometric composition of: 75% hydrogen and 25% nitrogen, molar percent, are introduced into the reaction chamber. The temperature of 400° C. and pressure of 10 MPa is maintained in the chamber. A catalyst in the form of ferromagnetic iron powder is placed inside the chamber. The function of the catalyst is to accelerate the synthesis of hydrogen and nitrogen in order to increase the efficiency of ammonia production process. During this synthesis, iron particles are put into oscillation by the oscillating magnetic field with induction of 15 mT and frequency of 333 Hz. Putting iron particles into oscillation increases the efficiency of ammonia production process by 60%.

This effect is associated with an increase in the efficiency of catalysis by the putting ferromagnetic catalyst particles into oscillation.

Example 6

The method of conducting a chemical reaction, involving the catalyst, comprising potato starch oxidation with hydrogen peroxide to produce a formulation comprising carboxyl and aldehyde groups. 42% aqueous suspension of potato starch is introduced into the reaction chamber. The temperature of 40° C. and atmospheric pressure is maintained in the chamber for 15 minutes. A ferromagnetic catalyst in the form of iron nanoparticles is placed inside the chamber. Then, 30% $H_2O_2$ solution is added dropwise to the reaction mixture so that the final concentration was 2 g/100 g in starch dry matter. The mixture is thermostated at 40° C. for an additional 60 min and at this time, the iron nanoparticles are put into oscillation by the oscillating magnetic field with induction of 500 mT and frequency of 2 Hz. Putting iron nanoparticles into oscillation increases the starch oxidation process efficiency by 80% relative to the efficiency of the process, wherein the ferromagnetic catalyst nanoparticles are motionless.

This effect is a consequence of putting the ferromagnetic catalyst nanoparticles into oscillation.

Example 7

The method of conducting a chemical reaction, involving the catalyst, comprising oxidation of CO to $CO_2$, as follows: the reaction gas having the composition of: 1% CO and 99% air, molar percent, are introduced into the reaction chamber. The temperature of 20° C. and pressure of 0.1 MPa is maintained in the chamber. Catalyst in the form of a powder comprising iron particles coated with platinum is placed inside the chamber. The purpose of platinum is to catalyse the reaction process of CO and oxygen in the air. During this synthesis, catalyst particles with an iron core are put into oscillation by the oscillating magnetic field with induction of 15 mT and frequency of 333 Hz. Putting platinum catalyst particles with a ferromagnetic core into oscillation, increases the oxidation process efficiency by 20%.

Example 8

The method of conducting a chemical reaction, involving the catalyst, comprising the decomposition of hydrogen into ions and electrons in a fuel cell. In the fuel cell of the polymer type, a powder composed of iron nanoparticles, which performs the role of a catalyst, is placed between the surface of the polymer electrolyte and the electrode surface portions that are adjacent to the polymeric electrolyte, wherein the amount of iron powder on the surface of the electrode is 5 mg/cm$^2$. At a time when the cell produces electricity, using hydrogen, iron particles are put into oscillation by the oscillating magnetic field with induction of 10 mT and frequency of 333 Hz.

Immediately after switching on the oscillating magnetic field, electric power at the output of the fuel cell increases by 200%. This effect is associated with increased efficiency of the process of catalysing the decomposition of hydrogen by putting iron catalyst nanoparticles into oscillation.

The above examples are merely illustrative of the application of the powder catalyst, both in the synthesis reactions and chemical analysis, whose particles comprising ferromagnetic material, in the form of a core, applied layer or as a whole consisting of ferromagnetic material, is put into oscillation by the oscillating magnetic field.

The invention claimed is:
1. A method comprising
   (a) conducting a chemical reaction comprising ammonia synthesis, including exposing to a reaction chamber:
      reactants,
         wherein the reactants include a reaction gas,
            wherein the reaction gas comprises a stoichiometric composition of 75% hydrogen and 25% nitrogen, molar percent, and
      a catalyst,
         wherein the catalyst comprises ferromagnetic iron powder,
   (b) concurrently with at least a portion of (a), setting and maintaining a pressure of the reaction chamber at 10 MPa and setting and maintaining a temperature of the reaction chamber at 400° C.,
      wherein the reaction occurs at the set temperature and pressure,
   (c) during at least a portion of (a) applying an external oscillating magnetic field of 10 mT and 333 Hz to the chemical reactants and catalyst undergoing the chemical reaction.
2. A method comprising:
   (a) conducting a chemical reaction comprising oxydation to form aldehyde groups, including
      (i) introducing to a reaction chamber a reactant of 42% aqueous suspension of potato starch,
      (ii) setting the reaction chamber including the aqueous suspension of potato starch introduced therein in (a)(i), at a temperature of 40° C. and at atmospheric pressure for 15 minutes,
      (iii) during at least a portion of (a)(ii), adding to the reaction chamber a catalyst in the form of ferromagnetic iron,
      (iv) subsequent to (a)(ii) adding drop wise to the reaction chamber, a reactant of 30% hydrogen peroxide solution until the concentration is 2 g/100 g in starch dry matter,
   (b) subsequent to (a)(iv), setting the temperature of the reaction chamber at 40° C. for 60 minutes,
   (c) during at least a portion of (a), applying an oscillating external magnetic field of 500 mT and 2 Hz to the reaction chamber.
3. A method comprising
   (a) conducting a chemical reaction comprising oxidation of CO to $CO_2$, including:
      (i) introducing into a reaction chamber set at a temperature of 20° C. and a pressure of 0.1 MPa reactants,
         wherein the reactants comprise 1% CO and 99% air,
      (ii) adding a catalyst to the reaction chamber,
         wherein the catalyst comprises powdered iron particles coated with platinum,

(b) during at least a portion of (a) applying an external oscillating magnetic field of 10 mT and 333 Hz to the chemical reactants and catalyst undergoing the chemical reaction.

4. A method comprising
(a) conducting a chemical reaction comprising decomposing hydrogen into ions and electrons in a fuel cell wherein the fuel cell includes
   polymeric electrolyte, and
      electrodes, wherein the electrodes include surface portions, wherein the surface portions are adjacent to the polymeric electrolyte,
      wherein the electrode surface portions include a powder comprised of iron nanoparticles in an amount of 5 mg/cm$^2$ on the surface portions,
(b) during at least a portion of (a), applying an external oscillating magnetic field of 15 mT and 333 Hz to the fuel cell.

* * * * *